(12) United States Patent
Rottmann

(10) Patent No.: US 7,825,950 B2
(45) Date of Patent: Nov. 2, 2010

(54) VIDEO MONITORING SYSTEM WITH OBJECT MASKING

(75) Inventor: Frank Rottmann, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 672 days.

(21) Appl. No.: 10/496,251

(22) PCT Filed: Oct. 25, 2002

(86) PCT No.: PCT/DE02/04012

§ 371 (c)(1),
(2), (4) Date: May 21, 2004

(87) PCT Pub. No.: WO03/049009

PCT Pub. Date: Jun. 12, 2003

(65) Prior Publication Data

US 2005/0129272 A1    Jun. 16, 2005

(30) Foreign Application Priority Data

Nov. 30, 2001  (DE) ................................ 101 58 990

(51) Int. Cl.
*H04N 7/12* (2006.01)
(52) U.S. Cl. .......................... 348/143; 348/61; 348/64; 348/77; 348/78; 348/159; 348/161; 348/152; 348/153
(58) Field of Classification Search ................ 348/143, 348/61, 64, 77, 78, 159, 156, 161, 152, 153
See application file for complete search history.

(56) References Cited

U.S. PATENT DOCUMENTS 5,164,827 A * 11/1992 Paff ............................ 348/143
6,188,777 B1 * 2/2001 Darrell et al. ............... 382/103
6,727,938 B1 * 4/2004 Randall ...................... 348/143

FOREIGN PATENT DOCUMENTS

| DE | 197 39 482 A1 | 3/1999 |
| DE | 100 01 252 A | 7/2001 |
| EP | 0 474 307 A2 | 3/1992 |
| EP | 1 081 955 A | 3/2001 |
| EP | 1 107 166 A | 6/2001 |
| WO | 03 010728 A | 2/2003 |

OTHER PUBLICATIONS

Hasegawa O., et al., "Real-Time Parallel and Ciioerative Recognition..." Proceedings of the IAPP International Conference on Pattern Recognition. Jerusalem, Oct. 9-13, 1994, Conference C: Signal Processing/ Conference D: Parallel Computing, Los Alamitos, IEEE Comp. Soc. Press, US, XP010216422, Section 3.1.1.

* cited by examiner

*Primary Examiner*—Andy S Rao
*Assistant Examiner*—Geepy Pe
(74) *Attorney, Agent, or Firm*—Michael J. Striker

(57) ABSTRACT

A video monitoring system is proposed, which is used to mask objects in a monitored scene that involve the privacy of an individual. Such objects include vehicle license plates or the person himself. An unmasking occurs when proof of legitimacy is entered. In a modification, a combination of a stationary camera and a moving camera also permits the masking of individual objects in the monitored scene.

6 Claims, 1 Drawing Sheet

VIDEO MONITORING SYSTEM WITH OBJECT MASKING

CROSS-REFERENCE TO A RELATED APPLICATION

The invention described and claimed hereinbelow is also described in German Patent Application DE 10 158 990.5 filed on Nov. 30, 2001. This German Patent Application provides the basis for a claim of priority of invention under 35 U.S.C. 119(a)-(d).

BACKGROUND OF THE INVENTION

The invention is based on a video monitoring system.

The patent application DE 197 39 482 A1 has disclosed a video monitoring system that is activated as needed. When the video monitoring system is not needed, either a shutter is placed in front of its camera or the scene being observed is set to a general out-of-focus setting.

SUMMARY OF THE INVENTION

The video monitoring system according to the invention with the characterizing features of the independent claim has the advantage over the prior art that now, individual objects in a scene can be localized and, depending on instructions, individual objects in the camera scene can be masked. The masking is then switched off when a predetermined event occurs. In order to provide a camera monitoring that is acceptable to the public, it is advisable to use the video monitoring system according to the invention, which prevents the identification of private individuals. In particular, it masks even moving objects dynamically and with precise imaging. The exact masking of objects permits a better overview of the scene and therefore a detailed depiction of events and conduct. All actions can be observed in detail, without revealing the identity of the person and thus invading privacy. In particular, this method makes it generally possible to monitor workplaces of employees, for example in the financial industry, within the limits of industrial law. This masking can detect the entire scene upon entry of an object, or can detect a partial region of the scene, or can detect all moving objects or a particular object, as well as partial regions of this object. For example, a person can be made up of a number of partial objects. It is thus possible to define the face as a particular object or also to detect regions of the eye, the torso, and the legs as additional objects. In vehicles, the license plate can be identified and masked.

The masking can take place in the camera, directly as part of the digitizing of the camera signal, before the image digitization and compression, before image storage, or before transmission to the display system.

Advantageous improvements of the video monitoring system disclosed in the independent claim are possible by means of the steps taken and modifications made in the dependent claims.

It is particularly advantageous that the masking means covers the at least one object with a uniform color tone or shade of gray. As a result, only the contours of the masked object can be seen on the display of the video monitoring system.

It is also advantageous that the event that triggers the unmasking of the masked object is either a predetermined point in time and/or is triggered by an entry into an input device of the video monitoring system. This entry can be an authorization or proof of legitimacy, i.e. a code, which is entered either manually or vocally. The entry here is also understood to include when the video monitoring system uses biometric measurement methods to recognize a particular person as legitimate. These biometric measurement methods include fingerprints, biometric measurement methods of the eyes, or image recognition of the person per se. But this also includes voice recognition. This can be broadened to the extent that this unmasking only occurs in the presence of two observers that must each offer proof of legitimacy.

It is also advantageous that the video monitoring system according to the invention also has a combination of stationary and moving cameras. Such panning and tilting cameras are used for object tracking and for enlarged observation of scene details. The masking is then executed via the rotation angle of the moving camera in conjunction with the stationary general view image so that the masking always follows the object. As a result, positions of moving objects can be masked out precisely to the pixel. The moving camera is thus combined with the stationary camera and aligned so as to establish an unambiguous image specification for every attainable position of the panning and tilting camera based on the general view image of the stationary camera. As a result, the camera image is masked in conjunction with the already localized object mask of the moving object so that no identification is possible. To that end, the view of the second stationary camera is displayed on the moving camera.

The object identification is executed by the processor based on a color distribution and/or a geometric form and/or a relationship of the first geometric form to a second geometric form and/or grayscale value or texture information.

The localization of the object in the camera image is executed through the known method of object segmentation in image sequences of stationary cameras. By storing a camera image of a former point in time, the scene is essentially portrayed without the moving object. This prior image is also referred to as the reference image. Information about the position of present objects can be obtained by subtracting the reference image from the current image. A process of binarization and segmentation makes it possible to extract a mask that is precise to the pixel for each object. The novel feature of the method disclosed is the use of the object mask to mask the camera image.

BRIEF DESCRIPTION OF THE DRAWINGS

Exemplary embodiments of the invention are shown in the drawings and will be explained in detail in the description that follows.

DESCRIPTION OF THE PREFERRED EMBODIMENTS

The monitoring of areas, particularly in public spaces or areas that adjoin public traffic zones, involves the problem of preserving and protecting the privacy of the individuals involved.

Other uses for the video monitoring system involve workspaces that require an observation and monitoring of actions and behaviors, but do not permit the identification of individuals in the first step. Only when there is a concrete suspicion, for example of the commission of illegal acts, can the identity protection be lifted with the aid of the correct proof of legitimacy. According to the invention, this is achieved here in that the video monitoring system according to the invention masks individual objects in a monitored scene.

Figure 1:
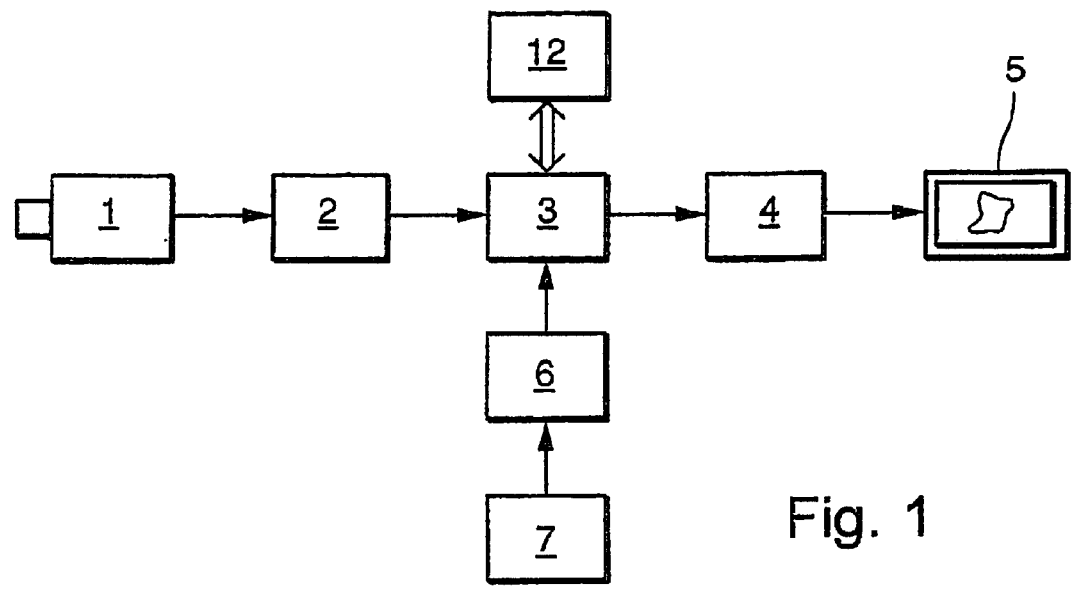
FIG. 1 is a block circuit diagram of the video monitoring system according to the invention.

FIG. 1 shows a block circuit diagram of the video monitoring system according to the invention. A camera 1 here is connected to a signal processing device 2 that is connected to a first data input of a processor 3. A second data input of the processor 3 is connected to a signal processing device 6, which is in turn connected to an input device 7. A data input/output port connects the processor 3 to a memory 12. The processor 3 is connected via a data output to an activating unit 4, which activates a display 5 that shows the monitored scene.

Only one camera 1 is shown here by way of example. However, combinations of different camera types or a number of cameras can be connected to one another, for example interconnected by means of a bus. In addition to normal video cameras, it is possible to use other camera types such as infrared cameras or other thermal imaging cameras. It is also possible to use combinations of video cameras and thermal imaging cameras. In addition, the cameras are moving and/or stationary. Moving cameras make it possible for objects to be tracked. The signal processing device 2 processes the camera signals coming from the camera 1 and prepares them for processing in the processor 3. The processor 3 executes an object detection with objects stored in the memory 12 in order to possibly mask out individual objects. The masking here is generated in the form of a homogeneous gray cover. It is also possible to use a color or for the mask to be kept colorless. The scene made up of the individual objects is then transmitted to the activating unit 4, which then activates the display 5. It is also possible here for more than one display to be triggered. The display 5 here is a normal monitor. However, flat screen displays and other display techniques can also be used here. The transmission to the display 5 can also take place via the Internet or via other data transmission lines. It is also possible for the display 5 to be in a different location than the camera 1, for example in a monitoring station of a security service.

In order to execute an unmasking of the masked objects, a proof of legitimacy is entered into the input device 7, whose signals the activating unit 6 then pre-processes for the processor 3. The unmasking is executed particularly if observation of the scene indicates the danger of illegal activity. This can be automatically detected through object recognition or can also be detected by an observer. It is also possible here for alarms to be attached to other sensors.

The authorization can be executed by entering a code, through a personal identification, through voice recognition, or, as explained above, through the use of biometric methods. It is also possible that the unmasking of objects is only executed if two separate individuals offer separate proof of legitimacy. In particular, this hinders misuse. The input device 7 can be a keypad, a microphone, or a biometric measuring device such as a fingerprint sensor with the attendant electronics.

Figure 2:
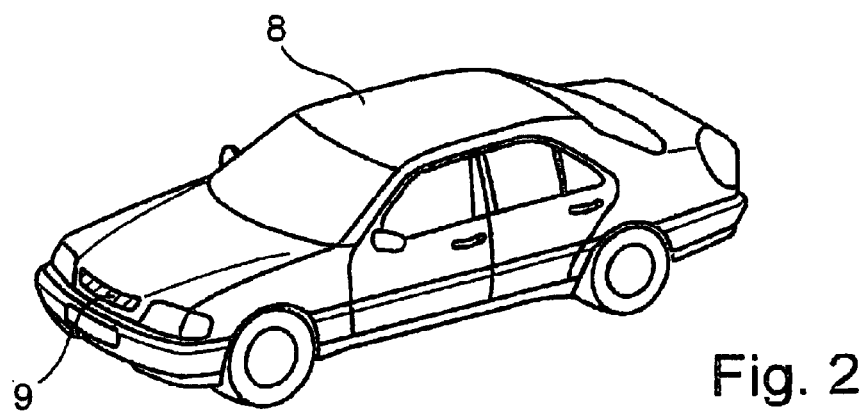
FIG. 2 shows the masking of a license plate.
Figure 3:
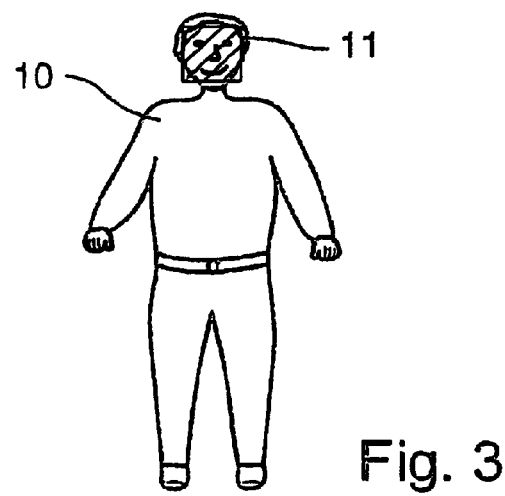
FIG. 3 shows the masking of a person's face.

FIG. 2 shows a masking of a car 8 in which a license plate 9 is masked by a gray blur. This makes it impossible to identify the vehicle, thus assuring the privacy of the vehicle owner. FIG. 3 shows another example in which the facial area 11 of a person 10 is masked. It is therefore not directly possible to identify the person. Unmasking for monitoring purposes is only possible by entering proof of legitimacy.

The invention claimed is:

1. A video monitoring system, wherein the video monitoring system has at least one camera (1) for monitoring a scene, a processor (3) that processes a camera signal, and a display (5) that shows the monitored scene, wherein the processor (3) from a camera signal identifies at least one object in the scene, localizes the at least one object, and extracts an object mask and that the video monitoring system has means for masking the at least one object with the object mask in the scene, wherein an unmasking occurs as a function of a predetermined event, wherein the video monitoring system has at least one stationary camera for recording a general view of the scene and at least one moving camera for recording a detail of the scene, wherein the mask is extracted from the stationary camera and the masking is adopted from the scene recorded by the stationary camera into the scene recorded by the moving camera.

2. The video monitoring system according to claim 1, wherein the masking means covers the at least one object with a uniform color tone or shade of gray.

3. The video monitoring system according to claim 1, wherein the event is a predetermined point in time and/or an entry into an input device (7) of the video monitoring system.

4. The video monitoring system according to claim 3, wherein the entry is an authorization and/or proof of legitimacy.

5. The video monitoring system according to claim 1, wherein the processor (3) executes the object identification in conjunction with a color distribution and/or a first geometric form and/or a relationship of the first geometric form to a second geometric form and/or a grayscale value or texture information.

6. A video monitoring system, wherein the video monitoring system has at least one camera (1) for monitoring a scene, a processor (3) that processes a camera signal, and a display (5) that shows the monitored scene, wherein the processor (3) from a camera signal identifies at least one object in the scene, localizes the at least one object, and extracts an object mask and that the video monitoring system has means for masking the at least one object with the object mask in the scene, wherein an unmasking occurs as a function of one of: a predetermined event and a determination that said at least one object has an association with illegal activity, wherein the video monitoring system has at least one stationary camera for recording a general view of the scene and at least one moving camera for recording a detail of the scene, and wherein the mask is extracted from the stationary camera and the masking is adopted from the scene recorded by the stationary camera into the scene recorded by the moving camera.

* * * * *